(12) United States Patent
Dean

(10) Patent No.: US 11,767,980 B2
(45) Date of Patent: Sep. 26, 2023

(54) LONGITUDINAL BURN POT ASSEMBLY AND IMPROVED AIR FLOW SYSTEM

(71) Applicant: Dansons US, LLC, Phoenix, AZ (US)

(72) Inventor: Jay Dean, Tempe, AZ (US)

(73) Assignee: Dansons US, LLC, Scottsdale, AZ (US)

( * ) Notice: Subject to any disclaimer, the term of this patent is extended or adjusted under 35 U.S.C. 154(b) by 358 days.

(21) Appl. No.: 17/088,074

(22) Filed: Nov. 3, 2020

(65) Prior Publication Data

US 2022/0136702 A1    May 5, 2022

(51) Int. Cl.
| | |
|---|---|
| F24B 5/02 | (2006.01) |
| F24B 7/04 | (2006.01) |
| A47J 37/07 | (2006.01) |
| A23B 4/052 | (2006.01) |
| F23N 3/08 | (2006.01) |
| A23B 4/044 | (2006.01) |

(52) U.S. Cl.
CPC .............. *F24B 5/026* (2013.01); *A23B 4/044* (2013.01); *A23B 4/0523* (2013.01); *A47J 37/0704* (2013.01); *A47J 37/0754* (2013.01); *F23N 3/08* (2013.01); *F24B 7/045* (2013.01); *A23B 4/052* (2013.01); *A47J 37/07* (2013.01)

(58) Field of Classification Search
CPC .......... F24B 5/026; F24B 7/045; F24B 5/023; F24B 5/06; F24B 5/087; A47J 37/07; A47J 37/0704; A47J 37/0754; A47J 37/0718; A23B 4/044; A23B 4/0523; A23B 4/052; F23N 3/08; F23B 80/04
USPC ...................... 126/77, 29, 25 R, 146; 99/324
IPC .......... F24B 5/02,5/06, 5/08, 7/04; A47J 37/07; A23B 4/044, 4/052; F23N 3/08; F23B 80/04
See application file for complete search history.

(56) References Cited

U.S. PATENT DOCUMENTS

| | | | | |
|---|---|---|---|---|
| 22,643 A | * | 1/1859 | Granger | F24B 5/026 126/77 |
| 49,652 A | * | 8/1865 | Robinson | F24B 5/026 126/77 |
| 693,725 A | * | 2/1902 | Leland | A47J 37/0704 99/446 |
| 733,432 A | * | 7/1903 | Shafer | F24B 5/026 126/77 |
| 3,792,654 A | * | 2/1974 | Turner | A23B 4/052 99/481 |

(Continued)

FOREIGN PATENT DOCUMENTS

| | | | | |
|---|---|---|---|---|
| EP | 4000481 A1 | * | 5/2022 | ............ F24B 5/026 |
| KR | 101987880 | | 6/2019 | |

OTHER PUBLICATIONS

European Search Report for Application No. 21205639.4, dated Apr. 25, 2022, 11 pages.

(Continued)

*Primary Examiner* — Steven B McAllister
*Assistant Examiner* — Daniel E. Namay
(74) *Attorney, Agent, or Firm* — Seyfarth Shaw LLP

(57) ABSTRACT

An appliance includes a burn pot assembly and air distribution ducts that distribute air into a burn chamber of the burn pot assembly, and distribute heated air to a cooking chamber of the appliance. A first air supply system may distribute air into the burn chamber, and a second air supply system may distribute heated air through one or more outlet manifolds towards the cooking chamber.

10 Claims, 5 Drawing Sheets

(56) References Cited

U.S. PATENT DOCUMENTS

| | | | | |
|---|---|---|---|---|
| 4,201,186 | A | * | 5/1980 | Paquin .................... F24B 1/022 |
| | | | | 126/69 |
| 4,777,928 | A | * | 10/1988 | Ellis ........................ F24B 7/025 |
| | | | | 126/72 |
| 7,637,258 | B2 | | 12/2009 | Cosgrove |
| 8,627,775 | B1 | * | 1/2014 | Wilson .................... F24B 5/026 |
| | | | | 110/308 |
| 9,844,300 | B2 | | 12/2017 | Cedar et al. |
| 2009/0056695 | A1 | * | 3/2009 | Cosgrove ............ A47J 37/0713 |
| | | | | 126/25 R |
| 2010/0264128 | A1 | * | 10/2010 | Cooper .................. A23B 4/044 |
| | | | | 219/507 |
| 2015/0201805 | A1 | * | 7/2015 | Cedar ................... A47J 37/0786 |
| | | | | 320/101 |
| 2017/0231426 | A1 | * | 8/2017 | Barford ............... A47J 37/0754 |
| | | | | 126/30 |
| 2018/0084945 | A1 | | 3/2018 | Aoyama |
| 2019/0078775 | A1 | * | 3/2019 | Kim ........................ F23B 30/00 |

OTHER PUBLICATIONS

Canadian Office Action for Application No. 3,136,970, dated Jan. 5, 2023, 3 pages.

* cited by examiner

LONGITUDINAL BURN POT ASSEMBLY AND IMPROVED AIR FLOW SYSTEM

TECHNICAL FIELD OF THE INVENTION

The presently disclosed embodiments relate generally to grills and smokers. More particularly, the presently disclosed embodiments relate to grills and smokers with an improved air flow system designed to evenly distribute air and heat.

BACKGROUND OF THE INVENTION

Smokers are a common outdoor cooking appliance that burn fuel at a low temperature to cause smoke to flow into a cook chamber. The smoke not only cooks the meat within the cook chamber but also provides flavor during the cooking process. Grills can use a similar process to burn fuel, typically at higher temperatures, to likewise provide a flavor to the food that is difficult to obtain using a conventional indoor cooking appliance.

Pellet grills and smokers are common types of appliances used for cooking meat or other food. These appliances burn pellets of wood based on a temperature of the cook chamber. A user can operate a controller to set the temperature of the cook chamber and the appliance will then burn pellets until the temperature is reached. Thereafter, the appliance will sense that the desired temperature has been reached and will temporarily halt the supply of pellets to avoid heating above the desired temperature, similar to a thermostat system.

Pellet grills and smokers typically include a burn pot assembly located at a bottom and center area of the appliance that directs heat and smoke upward. Some of these appliances struggle to direct heat and smoke to the entirety of the cook chamber due to the size and location of the burn pot assembly.

SUMMARY OF THE INVENTION

The presently disclosed embodiments include an appliance with a burn pot assembly and air distribution ducts that distribute air into a burn chamber of the burn pot assembly, and distribute heated air to a cooking chamber of the appliance. In particular, the presently disclosed embodiments may include be a first air supply system in which a first blower causes air to enter a first duct via a first air inlet of the first blower. The air may then be distributed into a heating manifold that heats the air, and distributes the heated air into the burn chamber. A second air supply system may also be included. The second air supply system may include a second blower that causes air to enter a second duct via a second air inlet of the second blower. The air may then be distributed into a center balancing duct, and distributed to end ducts. The air in the end ducts can be heated by activity in the burn chamber, and distributed to outlet manifolds, where the air may be further distributed through outlet holes towards the cooking chamber.

In particular, the presently disclosed embodiments include a burn pot assembly. The burn pot assembly includes a main body having first and second ends, a burn chamber disposed in the main body and extending longitudinally between the first and second ends, an outlet manifold coupled to the main body proximal to a top portion of the burn chamber and extending longitudinally between the first and second ends, a first air supply system coupled to the main body and adapted to distribute air towards the burn chamber, and a second air supply system coupled to the main body and adapted to distribute air proximal to the first and second ends and into the outlet manifold.

The presently disclosed embodiments also include a burn pot assembly. The burn pot assembly includes a main body having first and second ends, a burn chamber disposed in the main body and extending longitudinally between the first and second ends, and an air supply system coupled to the main body and adapted to distribute air towards the burn chamber.

The presently disclosed embodiments also include a burn pot assembly. The burn pot assembly includes a main body having first and second ends, a burn chamber disposed in the main body and extending longitudinally between the first and second ends, an outlet manifold coupled to the main body proximal to a top portion of the burn chamber and extending longitudinally between the first and second ends, and an air supply system coupled to the main body and adapted to distribute air proximal to the first and second ends and into the outlet manifold.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
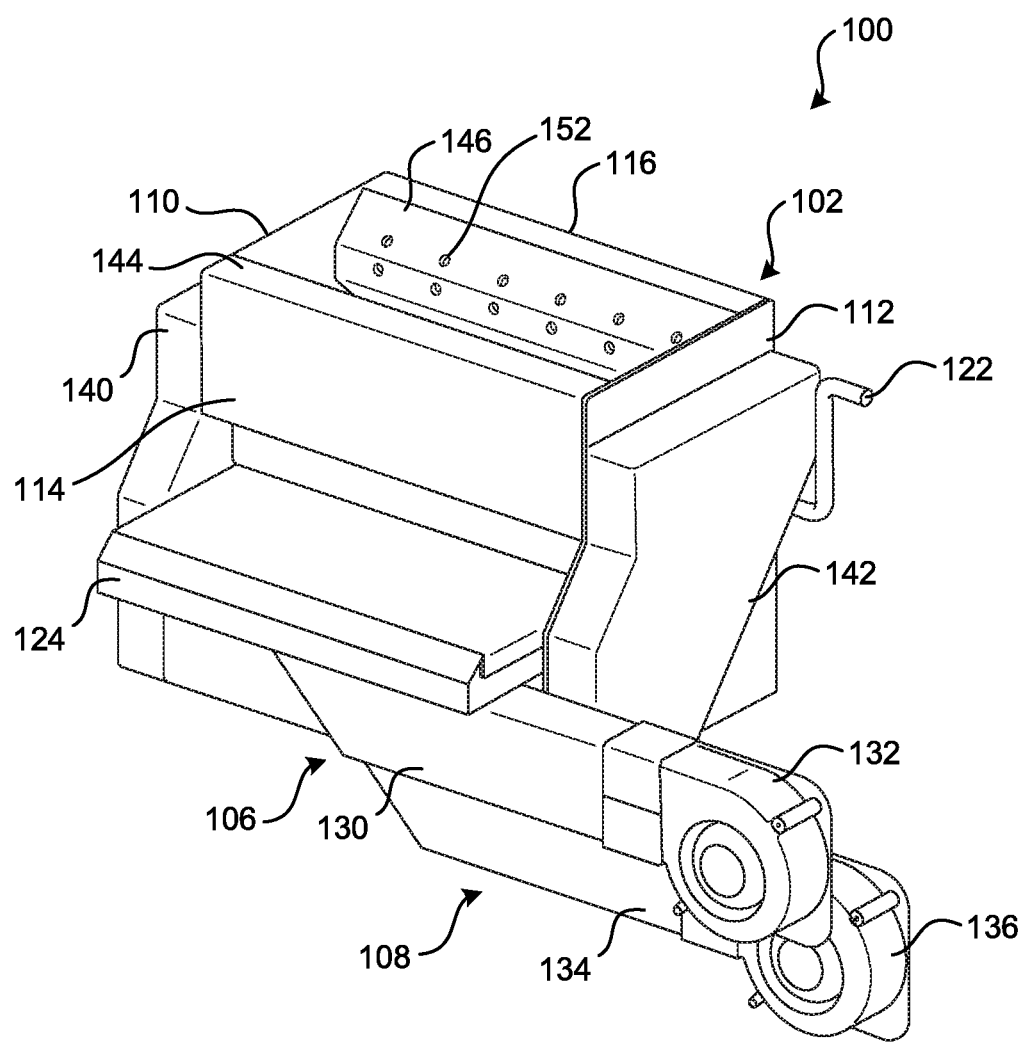
FIG. 1 is a front perspective view of a burn pot assembly according to at least one of the presently disclosed embodiments.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" and its functional equivalents is not intended to limit the scope of the claimed invention and is instead a term used to discuss exemplary embodiments of the invention for explanatory purposes only.

The presently disclosed embodiments include an appliance with a burn pot assembly and air distribution ducts that distribute air into a burn chamber of the burn pot assembly, and distribute heated air to a cooking chamber of the appliance. In particular, there may be a first air supply system in which a first blower causes air to enter a first duct via a first air inlet of the first blower. The air may then be distributed into a heating manifold that heats the air, and distributes the heated air into the burn chamber. A second air supply system may also be included. The second air supply system may include a second blower that causes air to enter a second duct via a second air inlet of the second blower. The air may then be distributed into a center balancing duct, and distributed to end ducts. The air in the end ducts can be heated by activity in the burn chamber, and distributed to outlet manifolds, where the air may be distributed through outlet holes towards the cooking chamber.

Figure 2:
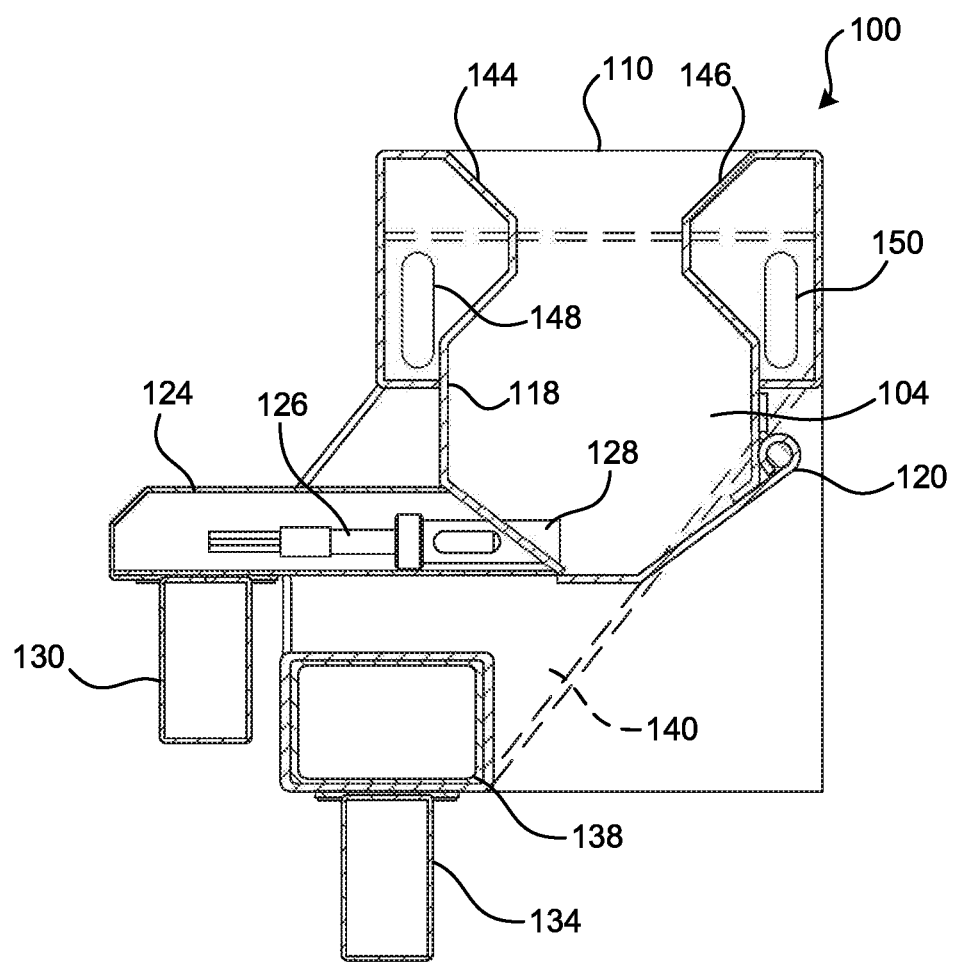
FIG. 2 is a sectional side view of the burn pot assembly of FIG. 1.

As shown in FIGS. 1 and 2, a burn pot assembly 100 for an appliance includes a main body or housing 102, a burn chamber 104 disposed or housed in the main body 102, a first air supply system or assembly 106 adapted to distribute air into the burn chamber 104, and a second air supply system or assembly 108 adapted to distribute heated air through one or more outlet manifolds towards a cooking chamber of an appliance.

The main body 102 includes first and second opposing ends 110 and 112, and first and second opposing sides 114 and 116. The burn chamber 104 may be a separate component disposed in the main body 102, or may be integrally formed with the main body 102. For example, the burn chamber 104 may be formed by internal walls 118 of the main body 102 that extend longitudinally between the first and second ends 110 and 112, and form a chamber adapted to receive fuel, such as wood or pellets. A pivotable flap 120 may also form a lower rear portion of the burn chamber 104, and be adapted to open and close via manipulation of handle 122. This allows ash and other debris to be removed from the burn chamber 104, for example to allow the burn chamber 104 to be cleaned.

As illustrated, the burn chamber 104 can have an octagonal type cross-sectional shape with an open top; however, the cross-sectional shape may be any other shape with an open top, including circular, square, rectangular, triangular, or other type of shape. Further, the fuel may be introduced into the burn chamber 104 via a distribution system (not shown). Such a distribution system may include a hopper assembly that receives pellets for operation. The hopper assembly can include an auger or other feeding mechanism that deposits the pellets into the burn chamber. The pellets in the burn chamber can then be ignited via combustion and produce heat and flames that cook food disposed in a cooking chamber or grate, as is well known in the pellet grill art.

To this effect, the burn pot assembly 100 may include a burn chamber manifold 124 coupled to the main body 102 proximal to a lower end of the first side 114. One or more heating elements 126 may be disposed in and/or housed in the burn chamber manifold 124. Each of heating elements 126 may be disposed in a tube 128 that partially extends through an aperture in the wall 118 and into the burn chamber 104. The heating elements 126 may be used to ignite fuel disposed in the burn chamber 104 to generate heat. As illustrated, there are three heating elements 126 equally spaced between along the first side 114; however more or less than three heating elements 126 may be included. The heating elements 126 may be a metallic heating element that is heated by a current flowing therethrough, but the heating element may also be ceramic type heating elements, or any other suitable type of heating element. Each of the heating element 126 may also be electrically coupled to a power supply, such as an electrical outlet or battery, and these power supplies may power the overall appliance or be dedicated to the burn pot assembly 100.

The first air supply system or assembly 106 includes a first duct 130 with a first end that is coupled to and opens into a central portion of the burn chamber manifold 124, and a second end that is coupled a first blower 132. Air may therefore be forced into the first air supply system 106 by the first blower 132 and proceed along this flow path into the burn chamber 104 and eventually to the cooking chamber to heat and cook food.

Figure 3:
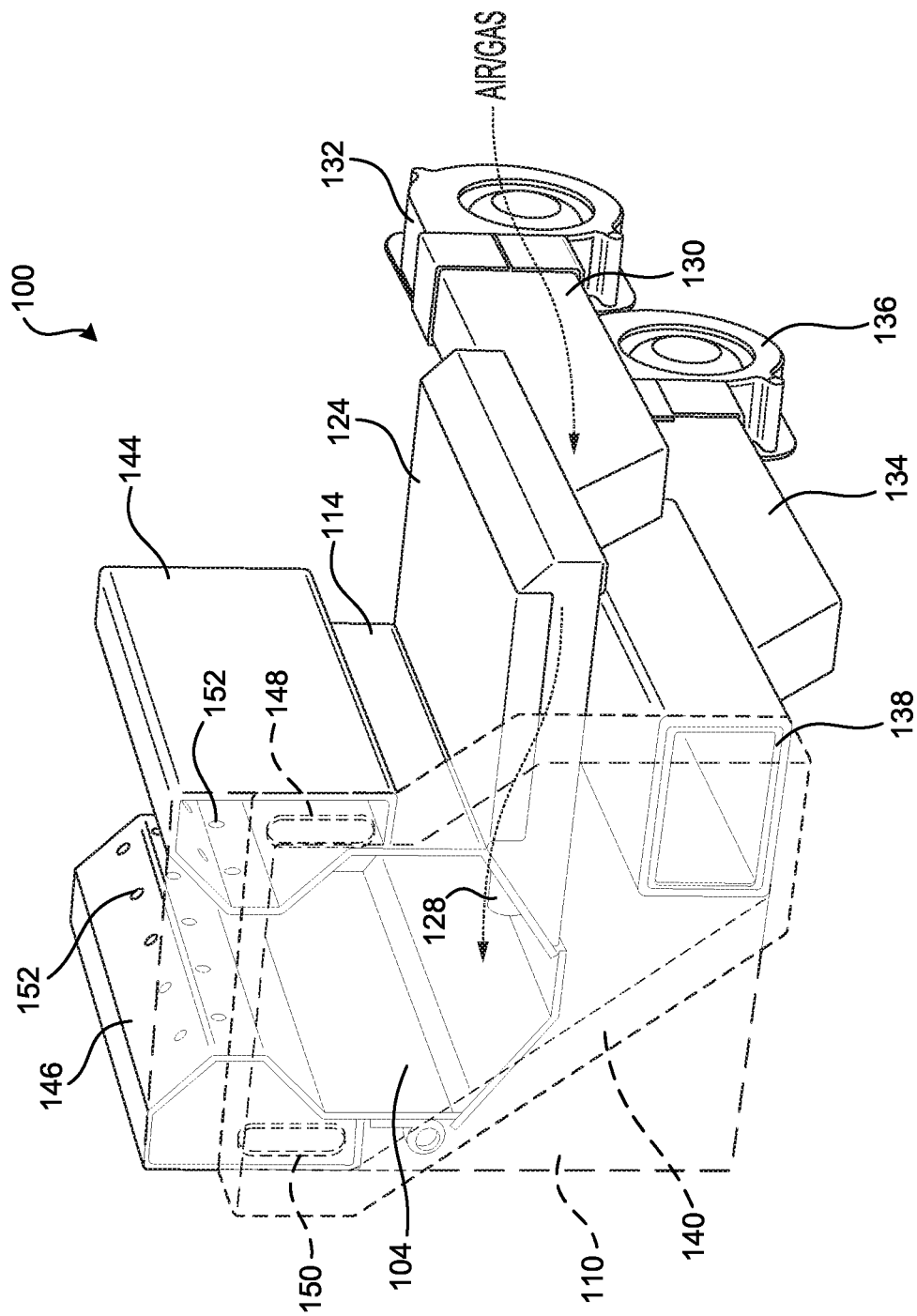
FIG. 3 is a perspective side view of the burn pot assembly of FIG. 1 with certain components shown in phantom, and illustrating a first air supply system.

Referring to FIG. 3, air or other gas(es) are pulled into the first duct 130 via an inlet of the first blower 132. The air or other gas(es) flow through the first duct 130 and are centrally distributed into the burn chamber manifold 124. In the burn chamber manifold 124, the air or other gas(es) may be heated by the heating elements 126 (when the heating elements 126 are activated or turned ON), and passed through the tubes 128 and into the burn chamber 104. This flow of air or other gas(es) may assist in igniting and controlling the burning of fuel, such as pellets, disposed in the burn chamber 104. For example, during a low heat operation, the flow of air or other gas(es) may be reduced. On the other hand, during a high heat operation, the amount of fuel and/or flow of air or other gas(es) in the burn chamber 104 may be increased.

Due to the Bernoulli and chimney effect, the flow of air or other gas(es) through the openings of tubes 128 may enter the burn chamber 104 at a higher velocity as compared to the velocity of the flow of air or other gas(es) in the burn chamber manifold 124 and first duct 130 so as to provide a circulation of the air or other gas(es) within the burn chamber 104. For example, air or other gas(es) can flow swiftly through the tubes 128 and fill more of the burn chamber 104. In doing so, heat generated in the burn chamber 104 is more evenly distributed when the heat exits the burn chamber and enters a cooking chamber or is applied to a cooking grate.

Referring back to FIGS. 1 and 2, the second air supply system or assembly 108 includes a second duct 134, a second blower 136 coupled to the second duct 134, a third duct 138, first and second end ducts 140 and 142 respectively disposed proximal to the first and second ends 110 and 112 of the main body 102, and first and second outlet manifolds 144 and 146 respectively disposed proximal to the first and second sides 114 and 116 of the main body 102.

The third duct 138 may be disposed in the main body 102 and be positioned below the burn chamber 104. The second duct 134 may have a first end coupled to the main body 102 and/or the third duct 138, and a second end coupled to the second blower 136. The third duct 138 may include an aperture that communicates with the second duct 134 and receives air or other gas(es) from the second duct 134. The third duct 138 may also extend longitudinally between the first and second ends 110 and 112 of the main body, and the aperture may be centrally located along the third duct 138. The ends of the third duct 138 may also include an aperture that communicates with respective apertures of the first and second end ducts 140 and 142, thereby providing a flow path through the third duct 138 and into the first and second end ducts 140 and 142.

The first and second end ducts 140 and 142 are respectively disposed on the first and second ends 110 and 112 of the main body 102, and each includes an aperture that communicates with the respective end of the third duct 138. As illustrated, the apertures of the first and second end ducts 140 and 142 are disposed proximal to a bottom of the respective first and second end ducts 140 and 142.

Each of the first and second end ducts 140 and 142 may also include first and second apertures 148 and 150. The first and second apertures 148 and 150 are respectively in communication with the first and second outlet manifolds 144 and 146. Each of the first and second ends 110 and 114 may also include apertures that align and communicate with the first and second apertures 148 and 150 to allow the first and second end ducts 140 and 142 to communicate with the first and second outlet manifolds 144 and 146, and provide a flow path from the third duct 138, through the first and second end ducts 140 and 142, and into the first and second outlet manifolds 144 and 146.

Each of the first and second outlet manifolds 144 and 146 extend between the first and second ends 110 and 114 of the main body 102. As illustrated, the first and second outlet manifolds 144 and 146 are integrally formed with the main body 102; however, the first and second outlet manifolds 144 and 146 may be separate components coupled to the main body 102. Additionally, each of the first and second outlet manifolds 144 and 146 includes one or more outlet apertures 152 on an inwardly facing side of the first and second outlet manifolds 144 and 146. The outlet apertures 152 allow air and other gas(es) to exit the first and second outlet manifolds 144 and 146, and be distributed to a cooking chamber or grate.

Figure 4:
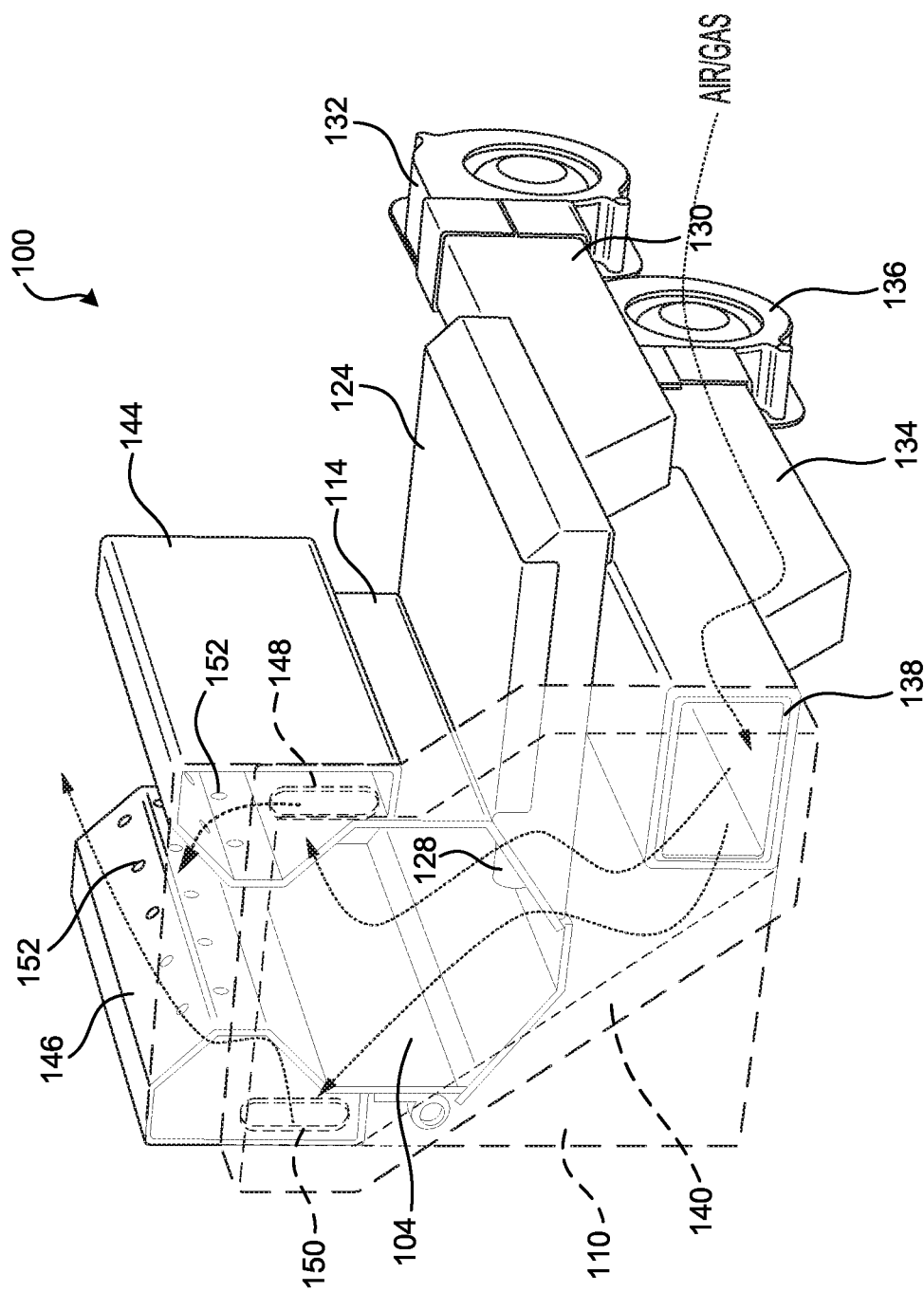
FIG. 4 is another perspective side view of the burn pot assembly of FIG. 1 with certain components shown in phantom, and illustrating a second air supply system.

Referring to FIG. 4, air or other gas(es) are pulled into the second duct 134 via an inlet of the second blower 136. The air or other gas(es) flow through the second duct 134 and are centrally distributed into the third duct 138. The third duct 138 receives the air or other gas(es), and distributes the air or other gas(es) to each of the first and second end ducts 140 and 142. During optimal operation, the amount of air or other gas(es) distributed from the third duct 138 to each of the first and second end ducts 140 and 142 is equal. This provides for equal distribution of air or other gas(es) along a longitudinal length and vertical height of the burn pot assembly 100.

The air or other gas(es) enter each of the first and second end ducts 140 and 142, flow through each of the first and second end ducts 140 and 142, and into each of the first and second outlet manifolds 144 and 146. The air or other gas(es) flowing through each of the first and second end ducts 140 and 142 may be heated by the activity in the burn chamber 104. For example, the positioning of the first and second end ducts 140 and 142 on opposing ends of the main body 102 also positions the first and second end ducts 140 and 142 on opposing ends of the burn chamber 104. Accordingly, indirect heat from the burn chamber 104 heats the air or other gas(es) as it flows through first and second end ducts 140 and 142.

Each of the first and second outlet manifolds 144 and 146 receive the heated air or other gas(es) from each of the first and second end ducts 140 and 142. For example, the first end duct 140 distributes air or other gas(es) to both of the first and second outlet manifolds 144 and 146 (via first and second apertures 148 and 150) at a first end of each of the first and second outlet manifolds 144 and 146; and the second end duct 142 distributes air or other gas(es) to both of the first and second outlet manifolds 144 and 146 (via first and second apertures 148 and 150) at a second end of each of the first and second outlet manifolds 144 and 146. During optimal operation, the amount of air or other gas(es) distributed from the first and second end ducts 140 and 142 to each of the first and second outlet manifolds 144 and 146 is equal. This provides for equal distribution of air or other gas(es) along a longitudinal length and vertical height of the burn pot assembly 100.

The air or other gas(es) flowing through each of the first and second outlet manifolds 144 and 146 may be further heated by the activity in the burn chamber 104. For example, the positioning of the first and second outlet manifolds 144 and 146 on opposing sides of the main body 102 also positions the first and second end outlet manifolds 144 and 146 longitudinally along and proximal to a top portion of the burn chamber 104. Accordingly, indirect heat from the burn chamber 104 may further heat the air or other gas(es) as it flows through first and second outlet manifolds 144 and 146. The air or other gas(es) also exit the outlet apertures 152, which are spaced longitudinally along each of the first and second end outlet manifolds 144 and 146. The heated air or other gas(es) exiting the outlet apertures 152 may then be distributed to a cooking chamber or grate.

Again, due to the Bernoulli and chimney effect, the flow of air or other gas(es) through the outlet apertures 152 may exit at a higher velocity as compared to the velocity of the flow of air or other gas(es) in the first and second outlet manifolds 144 and 146, first and second end ducts 140 and 142, and second and third ducts 134 and 138 so as to provide a circulation of the air or other gas(es). For example, air or other gas(es) can flow swiftly through the outlet apertures 152 and fill more of and be equally distributed in the cooking chamber. In doing so, heat is more evenly distributed when the heat exits the first and second outlet manifolds 144 and 146 and enters a cooking chamber or is applied to a cooking grate.

Figure 5:
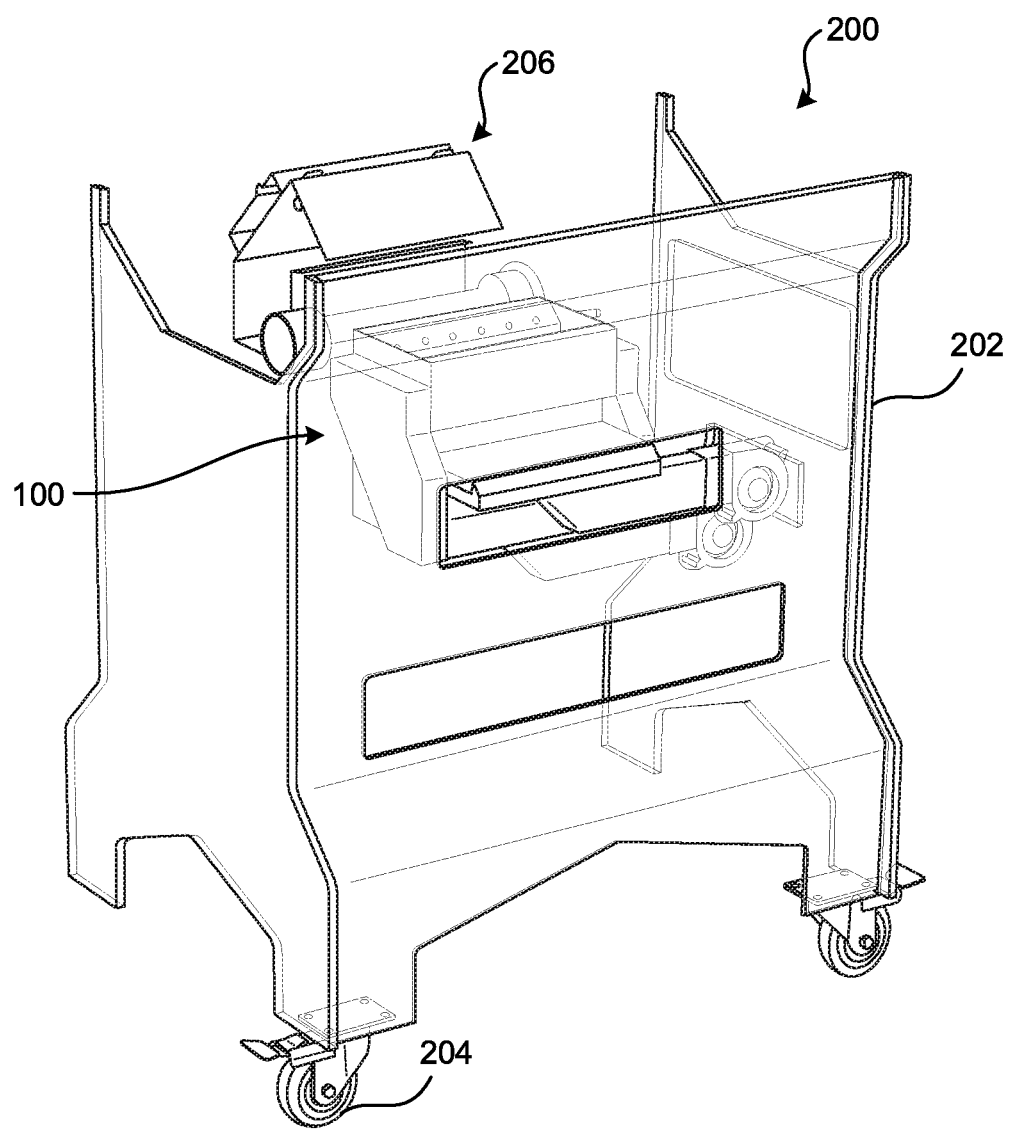
FIG. 5 is a perspective view of a partially assembled appliance including the burn pot assembly of FIG. 1 according to at least one of the presently disclosed embodiments.

The burn pot assembly 100 may be installed in an appliance, such as a grill, such as the partially assembled grill 200 of the type illustrated in FIG. 5. The grill 200 may include a cooking chamber a base 202 having wheels 204. As shown, the burn pot assembly 100 may be disposed longitudinally in the grill 200. The grill 200 may also include a fuel distribution system 206 with a hopper assembly that receives pellets, and an auger or other feeding mechanism that deposits the pellets into the burn chamber. The pellets in the burn chamber can then be ignited via combustion and produce heat and flames that cook food disposed in a cooking chamber or grate (not shown, but would be located above the burn pot assembly, as is known in the pellet grill art), where food can be placed during a cooking operation. For example, meat or vegetables can be cooked in either a grilling or smoking application. The cooking chamber can further include a lid or door that allows the user access to the cooking chamber so the user can retrieve or adjust food being cooked within the cooking chamber.

The temperature inside the cooking chamber can be adjusted and controlled by a controller that can be set by a user to control the internal temperature of the cooking chamber. For example, a user can set the cooking chamber to a temperature of 350 degrees, and the grill 200 will burn fuel and/or distribute air (in the burn pot assembly 100) to heat the cooking chamber until the temperature reaches 350 degrees based on a temperature sensor located within the cooking chamber. Once the temperature reaches 350 degrees, the controller will control the heating to reduce or eliminate the supply of heat temporarily. For example, and without limitation, the controller can then decrease the heat provided by reducing or preventing the supply of pellets to the burn pot assembly 100 and/or increasing or reducing the amount of flow of air or other gas(es) in the burn pot assembly 100.

As used herein, the terms "grill" or "smoker" are intended to be construed broadly as including any outdoor cooking appliance that uses heat. For example, a "grill" or "smoker" according to the present invention can include a grill, smoker, griddle, burner, wood stove, outdoor heater, or any other outdoor cooking appliance that uses heat.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A burn pot assembly, comprising:
a main body having first and second ends;
a burn chamber disposed in the main body and extending longitudinally between the first and second ends;
a first blower;
a first duct coupled to the first blower and adapted to receive air provided by the first blower;
a second duct coupled to the first duct at a first duct end and extending adjacent to the first duct alongside a first end of the main body, the second duct having a second duct aperture at a second duct end opposite the first duct end;
an outlet manifold coupled to the main body with at least the second duct aperture communicating air from the second duct to the outlet manifold, the outlet manifold extending longitudinally between the first and second ends of the main body and having outlet apertures for distributing air provided through the second duct aperture.

2. The burn pot assembly of claim 1, further comprising a second blower providing air to a burn chamber manifold, the burn chamber manifold including heating elements for heating the air provided by the second blower, the burn chamber manifold communicating with the burn chamber through a tube.

3. A burn pot assembly, comprising:
a main body having first and second ends;
a burn chamber disposed in the main body and extending longitudinally between the first and second ends;
a first blower;
a side duct extending along the first end and having a first duct end receiving air originally provided by the first blower, and a side duct aperture at a second duct end for distributing the air received at the first duct end; and
an outlet manifold coupled to the main body and extending longitudinally between the first and second ends of the main body, the outlet manifold receiving air from the side duct at the side duct aperture and having outlet apertures for distributing air provided through the side duct aperture to the burn chamber.

4. The burn pot assembly of claim 3, further comprising a second blower coupled to a burn chamber manifold, the burn chamber manifold having heating elements therein and communicating with the burn chamber.

5. The burn pot assembly of claim 4, wherein the burn chamber manifold communicates with the burn chamber via a tube.

6. A burn pot assembly, comprising:
a main body having first and second ends;
a burn chamber disposed in the main body and extending longitudinally between the first and second ends;
an outlet manifold coupled to the main body proximal to a top portion of the burn chamber and extending longitudinally between the first and second ends;
a first air supply system coupled to the main body and adapted to distribute air towards the burn chamber; and
a second air supply system coupled to the main body and adapted to distribute air proximal to the first and second ends and into the outlet manifold,
wherein the second air supply system includes second and third ducts, wherein the third duct is disposed in the main body and extends longitudinally between the first and second ends, and the second duct is coupled to the third duct and is adapted to distribute air into the third duct; and
wherein the second air supply system includes first and second end ducts respectively disposed proximal to the first and second ends of the main body, wherein the first and second end ducts are adapted to receive the air from the third duct.

7. The burn pot assembly of claim 6, wherein the first and second end ducts are each adapted to distribute air into the outlet manifold.

8. The burn pot assembly of claim 7, wherein the burn chamber is adapted to heat the air in the first and second end ducts.

9. The burn pot assembly of claim 7, wherein the outlet manifold includes first and second outlet manifolds, each having outlet apertures on an inwardly facing side of the first and second outlet manifolds.

10. The burn pot assembly of claim 9, wherein each of the first and second end ducts is adapted to distribute air into each of the first and second outlet manifolds.

* * * * *